United States Patent
Berghmans et al.

(10) Patent No.: US 8,642,891 B2
(45) Date of Patent: Feb. 4, 2014

(54) CLOSURE AND INTERCONNECT SYSTEMS AND METHODS OF USING DRY SILICONE GELS IN CLOSURE AND INTERCONNECT SYSTEMS

(75) Inventors: Stephane J. G. Berghmans, Brussels (BE); Michael A. Oar, San Francisco, CA (US); Miguel A. Morales, Fremont, CA (US); Gary W. Adams, Holly Springs, NC (US); Anne-Marie Prins, Kessel-Lo (BE); Nathalie Hendrickx, Wilsele (BE); Guenter Feldmeier, Lorsch (DE); Rudi Kraemer, Lautertal-Beedenkirchen (DE); Bert Bergner, Bensheim (DE); Kristof Vastmans, Boutersem (BE)

(73) Assignees: Tyco Electronics AMP GmbH, Bensheim (DE); Tyco Electronics Raychem BVBA, Kessel-Lo (BM); Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/164,317

(22) Filed: Jun. 20, 2011

(65) Prior Publication Data

US 2012/0320535 A1 Dec. 20, 2012

(51) Int. Cl.
*H01B 3/46* (2006.01)
*G02B 6/255* (2006.01)

(52) U.S. Cl.
USPC .......... 174/154; 174/137 B; 174/137 R; 174/138 C; 174/521; 174/527; 385/99; 528/31; 528/32

(58) Field of Classification Search
None
See application file for complete search history.

(56) References Cited

U.S. PATENT DOCUMENTS

| | | | |
|---|---|---|---|
| 4,374,967 A | 2/1983 | Brown et al. | |
| 4,852,646 A * | 8/1989 | Dittmer et al. | 165/185 |
| 5,079,300 A * | 1/1992 | Dubrow et al. | 525/106 |
| 5,886,111 A * | 3/1999 | Chiotis et al. | 525/478 |
| 6,030,919 A | 2/2000 | Lewis | |
| 6,091,871 A | 7/2000 | Elisson et al. | |
| 6,167,178 A | 12/2000 | Navé, | |
| 6,235,801 B1 | 5/2001 | Morales et al. | |
| 6,254,105 B1 | 7/2001 | Rinde et al. | |
| 6,586,105 B2 * | 7/2003 | Eguchi et al. | 428/447 |
| 7,489,844 B2 | 2/2009 | Shinoski | |
| 7,522,795 B2 | 4/2009 | Nothofer et al. | |
| 7,603,018 B2 | 10/2009 | Mullaney et al. | |
| 7,829,648 B2 * | 11/2010 | Tanaka et al. | 528/15 |
| 7,835,613 B2 * | 11/2010 | Mohrmann et al. | 385/135 |
| 2004/0050152 A1* | 3/2004 | King | 73/150 A |
| 2007/0244230 A1 | 10/2007 | Sixt et al. | |
| 2009/0060445 A1 | 3/2009 | Mullaney et al. | |

FOREIGN PATENT DOCUMENTS

| | | |
|---|---|---|
| EP | 0371641 A1 | 6/1990 |
| WO | WO-2006/076749 A1 | 7/2006 |
| WO | WO-2007/127213 A2 | 11/2007 |

OTHER PUBLICATIONS

International Search Report for International Application No. PCT/EP2012/061166, mailed Oct. 9, 2012.
International Search Report for International Application No. PCT/EP2012/061771, mailed Oct. 5, 2012.
Lewis et al., "Platinum Catalysts Used in the Silicones Industry, Their Synthesis and Activity in Hydrosilylation", Platinum Metals Rev., 1997, 41, (2), 66-75.

\* cited by examiner

*Primary Examiner* — Marc Zimmer
(74) *Attorney, Agent, or Firm* — Brinks, Gilson & Lione

(57) ABSTRACT

Methods and systems are provided for a dry silicone gel in a closure or interconnect system. The dry silicone gel may be made by reacting a crosslinker, a chain extender, and a vinyl-terminated polydimethylsiloxane. The reaction may be conducted in the presence of a catalyst. In certain embodiments, the dry silicone gel may comprise: (1) a hardness between 100 g and 300 g, (2) a stress relaxation between 30% and 60% when subjected to a deformation of 50% of the original size of the gel, (3) a compression set between 4% and 20% after 50% strain has been applied to the gel for 1000 hours at 70° C., and/or (4) less than 10% oil bleed out under compression of 1.2 atm after 60 days at 60° C.

25 Claims, 8 Drawing Sheets

CLOSURE AND INTERCONNECT SYSTEMS AND METHODS OF USING DRY SILICONE GELS IN CLOSURE AND INTERCONNECT SYSTEMS

REFERENCE TO RELATED APPLICATION

Reference is made to U.S. patent application entitled "Dry Silicone Gels and Their Methods of Making," filed the same day as the present application. This entire co-pending application is incorporated by reference.

BACKGROUND

Closure systems are used to protect internal components from degradation caused by external environments. For example, internal components such as fiber optic cables and copper cables are often enclosed in closure systems. Examples of commercially available closure systems include the Outdoor Fiber Drop Repair (OFDR), the Outdoor Fiber Distribution Closure (OFDC), and the Fiber optic Infrastructure System Technology (FIST), available from Tyco Electronics, Kessel-Lo, Belgium. In particular, the OFDR Closure is used to break out fibers from a looped fiber optic cable to connect users such as business customers or persons in multiple or single living units. These types of closures can be used in aerial, pedestal, and underground environments. Other closure systems are commercially available for use with communication and energy transmission cables.

Closure systems typically include internal components such as fiber organizers, cable seals and termination devices, drop cable seals for a number of drops with drop cable termination devices, and universal splice holders for a number of splices. These internal components may be subject to environmental factors such as varying moisture levels, heat and cold, and exposure to other chemical substances. The closure systems are preferably protected from damage with a sealant of some sort. Conventional sealants, however, suffer from a number of drawbacks that make them unsuitable for certain closure systems.

Sealants are often used for insulation and for protection against water, corrosion and environmental degradation, and for thermal management. Prior to now, a number of sealants have been known; however, currently available sealants have certain drawbacks and disadvantages that make them inadequate for specific uses and for use in contact with certain materials. In particular, there is an unmet need for sealants that are suitable for fiber optic and electronic closure systems.

Suitable sealing systems for closures are needed for use with a variety of different cables. For examples, a sealing system is needed for cables termed Low Smoke Zero Halogen ("LSZH"), also known as Low Smoke Halogen Free ("LSHF"), Low Smoke Zero Halogen ("LSOH"), and Zero Halogen Low Smoke ("OHLS") among other things.

LSZH cables are characterized by containing no halogenated flame-retardants, and produce relatively limited amounts of smoke when exposed to sources of heat such as a flame or heated wires. LSZH cables provide an alternative to the frequently used polyethylene, PVC, or thermoplastic urethane coatings. Polyethylene, PVC, or thermoplastic urethane, when they contain halogens, may produce hazardous halogen-containing compounds such as HCl or HBr gas. An improvement to current LSZH cable closure systems is needed to enhance performance in environmentally sensitive environments.

Traditionally, thermoplastic oil gels have been used in LSZH closure systems. A problem, however, with thermoplastic gels used as sealants, and in closure systems in general, is that they often contain high amounts of mineral oil. A problem has been observed with oil-containing gels in that they may leak oil. The oil in these gels may leak from the gel and cause deterioration, discoloring, or degradation of the cable in the closure system. In some extreme cases, a cable may even snap under compression due to the damage done by the oil leaking from the thermoplastic gel. There exists an unmet need for alternatives to oil containing gels. Presently available alternatives to oil-containing gels, however, have not provided such a solution. For one, sealants other than oil-containing gels may have one or more undesirable properties. Examples of undesirable properties include excessive hardness, inadequate temperature resistance (e.g., flammability or a tendency to become brittle with cold, i.e., inadequate glass transition temperature) and viscoelastic properties, chemical incompatibility, high water absorption, and hydrolytic instability. Accordingly there exists an unmet need for closure systems with suitable hardness, viscoelastic properties, low permanent set or compression set, long-term performance (e.g., >20 years), amongst other properties.

In contrast to oil-containing thermoplastic gels, dry silicone thermoset gels contain relatively low, or do not contain at all, amounts of diluent fluids such as unreactive silicone oil or mineral oil. A dry silicone gel, instead of being a thermoplastic gel, is a thermoset gel. Thermoset gels can be produced by chemical crosslinking. Examples of thermoset gels are silicone dry gels and polyurethane gels. A dry silicone gel makes no use of an extra solvent or diluent fluid but can still be categorized under the term "gel" because of the similarity in physical properties and behavior, or because of its viscoelastic properties. Dry silicone gels are however used more rarely than free oil-containing gels for a number of reasons. For example, dry silicone gels are rare because they are more expensive and difficult to process than certain other types of gels. Accordingly, there exists an unmet need for an improved dry silicone gel and an improved method of preparing a dry silicone gel.

U.S. Pat. No. 7,489,844 discloses fiber optic cable with a suspension liquid surrounding the optical fiber. The suspension oil may be mineral oil or a blend of oil and silica.

U.S. Pat. No. 6,091,871 discloses a reinforced optical fiber cable that includes a protective tube for protecting optical fibers, a reinforcing layer, and reinforcing rods around the protective tube, together with an outer sheath. The inside space in which the optical waveguides are received contains a filler material to protect the optical waveguides against penetration of moisture.

U.S. Pat. No. 6,167,178 discloses a fiber optic cable including at least one optical fiber having a buffer layer formed of a flame-retardant polyolefin material. The flame-retardant polyolefin material is tightly formed about the optical fiber, thereby defining a tight buffer layer, a layer of strength members, and a cable jacket surrounding optical fibers in contact with at least some strength members.

U.S. Pat. No. 7,522,795 discloses a loose tube optical waveguide cable with two or more optical waveguides with a single protective tube, or sheath for environmental protection. The cable contains no gel-like compounds and no strengthening elements.

BRIEF SUMMARY

In one embodiment, a method is provided of using dry silicone gels. The method comprises using a dry silicone gel in a closure or interconnect system. In certain embodiments, the closure system is a fiber optic closure system. In other embodiments, the closure system is an electrical closure system. In certain embodiments, the interconnect system comprises a mini input/output connector, a data connector, a power connector, a fiber optic connector, or combination thereof. In certain embodiments, the dry silicone gel in the closure or interconnect system has flame retardant properties.

In some embodiments, the dry silicone gel is compatible with a LSZH cable as determined by a pressure loss test or tightness test following at least one of the following mechanical or environmental tests: axial tension test, flexure test, re-entry test, torsion test, resistance to aggressive media test, resistance to stress cracking test, salt fog test, temperature cycling test, and waterhead test.

In some embodiments, the dry silicone gel is made by reacting a crosslinker, a chain extender, and a vinyl-terminated polydimethylsiloxane. In certain embodiments, the dry silicone gel has a hardness between 26 and 53 Shore 000 Hardness or between 100 grams ("g") and 300 g as measured on a TA-XT2 texture analyzer from Texture Technologies. In other embodiments, the dry silicone gel has a hardness between 37 and 45 Shore 000, or between 160 g and 220 g. In some embodiments, the dry silicone gel has an original size and a stress relaxation between 30% and 60%, or between 40% and 60% when subjected to a deformation of 50% of the original size. In other embodiments, the dry silicone gel has a compression set between 4% and 20%, or between 10% and 14% after 50% strain has been applied to the gel for 1000 hours at 70° C. In certain embodiments, the dry silicone gel has less than 10% oil bleed out under compression of 1.2 atm after 60 days at 60° C.

In another embodiment, a method is provided of using dry silicone gels. The method comprises using a dry silicone gel in a closure system, wherein the closure system is a fiber optic closure system, and wherein the dry silicone gel is made by reacting a crosslinker, a chain extender, and a vinyl-terminated polydimethylsiloxane in the presence of a catalyst. The dry silicone gel further comprises: (1) a hardness between 160 g and 220 g (37-45 Shore 000 Hardness), (2) a stress relaxation between 40% and 60% when subjected to a deformation of 50% of the original size of the gel, (3) a compression set between 10% and 14% after 50% strain has been applied to the gel for 1000 hours at 70° C., and (4) less than 10% oil bleed out under compression of 1.2 atm after 60 days at 60° C.

In yet another embodiment, a closure system including a dry silicone gel is provided. The closure or interconnect system comprises a housing, a cable, and the dry silicone gel. In some embodiments, the system further comprises a connector and receptacle for the connector. In certain embodiments, the dry silicone gel in the system is made by reacting a crosslinker, a chain extender, and a vinyl containing polydimethylsiloxane together. In some embodiments, the crosslinker, chain extender, and vinyl-containing polydimethylsiloxane are reacted in the presence of a catalyst.

In certain embodiments, the cable in the system is an LSZH cable, and the gel is compatible with the LSZH cable as determined by a pressure loss test or tightness test following at least one of the following mechanical or environmental tests: axial tension test, flexure test, re-entry test, torsion test, resistance to aggressive media test, resistance to stress cracking test, salt fog test, temperature cycling test, and waterhead test.

In certain embodiments, the dry silicone gel has a hardness between 100 g and 300 g (26-53 Shore 000 Hardness), or between 160 g and 220 g (37-45 Shore 000). In some embodiments, the dry silicone gel has an original size and a stress relaxation between 30% and 60%, or between 40% and 60% when subjected to a deformation of 50% of the original size. In other embodiments, the dry silicone gel has a compression set between 4% and 20%, or between 10% and 14% after 50% strain has been applied to the gel for 1000 hours at 70° C. In certain embodiments, the dry silicone gel has less than 10% oil bleed out under compression of 1.2 atm after 60 days at 60° C.

In certain embodiments, the dry silicone gel comprises between 0.1 wt % and 25 wt % of a flame retardant additive. In some embodiments, the flame retardant additive in the dry silicone gel composition is zinc oxide.

DETAILED DESCRIPTION

Figure 1:
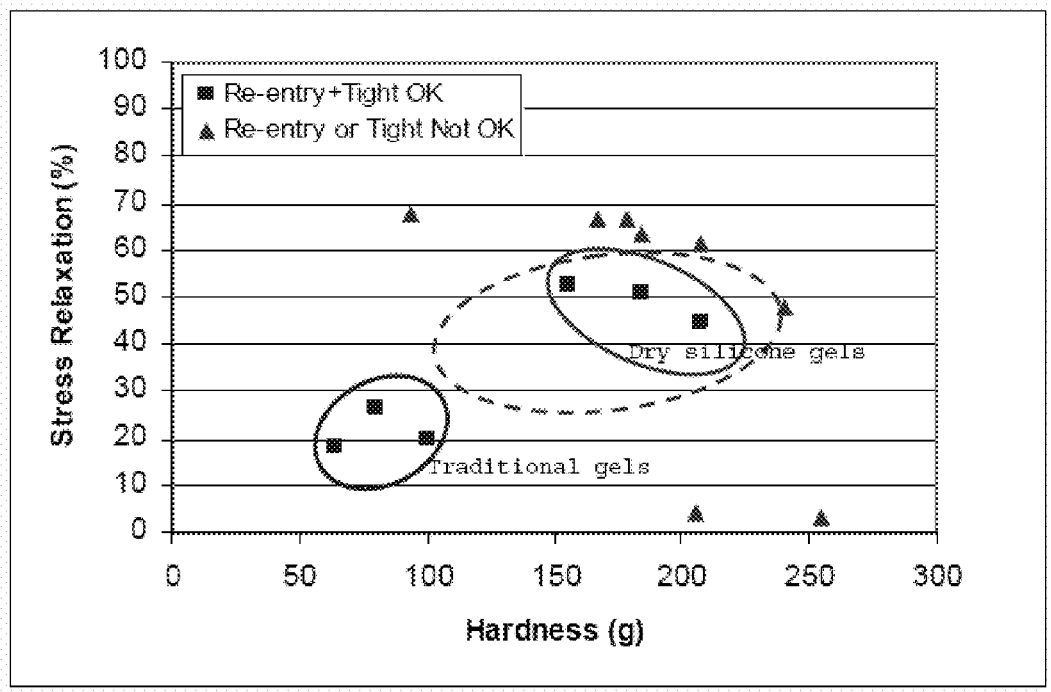
FIG. 1 is a graph showing the hardness (g) verses stress relaxation (%) of dry silicone gels as measured on a TA-XT2 texture analyzer from Texture Technologies (Westchester County, New York). The squares provide examples of gels that are tight and re-enterable; the red triangles provide examples of gels that fail on "tightness" and/or "re-entry." The solid oval in the bottom left of the graph indicates examples of traditional thermoplastic elastomer gels. The solid oval to the right indicates a specific region for dry silicone gels. Three examples of dry silicone gel are shown within the oval. The dotted oval indicates an extended range of acceptable dry silicone gels.

As used herein, terms such as "typically" are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

As used herein, the terms "comprise(s)," "include(s)," "having," "has," "contain(s)," and variants thereof, are intended to be open-ended transitional phrases, terms, or words that do not preclude the possibility of additional acts or structure.

Any concentration range, percentage range, or ratio range recited herein are to be understood to include concentrations, percentages, or ratios of any integer within that range and fractions thereof, such as one tenth and one hundredth of an integer, unless otherwise indicated. Also, any number range recited herein relating to any physical feature are to be understood to include any integer within the recited range, unless otherwise indicated. It should be understood that the terms "a" and "an" as used above and elsewhere herein refer to "one or more" of the enumerated components. For example, "a" polymer refers to one polymer or a mixture comprising two or more polymers.

As used herein, the term "dry silicone gel" may refer to a chemically crosslinked polymer having a Si—O backbone and comprising a relatively low amount, or no amount at all, of diluent fluids such as silicone oil or mineral oil. As opposed to carbon-based polymers, the crosslinked silicone polymers of dry silicone gels are based on a Si—O backbone. The characteristics of silicon and oxygen provide crosslinked polymers with their exceptional properties. For example, silicon forms stable tetrahedral structures, and silicon-oxygen bonds are relatively strong which results in dry silicone gels with high temperature resistance. In addition, crosslinked Si—O polymers have a relatively high chain flexibility as well as low rotational energy barrier.

The dry silicone gels may be made according to a number of different polymerization reactions. In certain embodiments, the polymerization reaction is a hydrosilylation reaction, also referred to as a hydrosilation reaction. In some embodiments, the hydrosilylation reaction makes use of a platinum catalyst, while other embodiments make use of radicals. In further embodiments, the dry silicone gel is made by a dehydrogenated coupling reaction. In other embodiments, the dry silicone gel is made by a condensation cure RTV reaction.

In certain embodiments, the dry silicone gel is made by reacting at least a crosslinker, a chain extender, and a base polymer (e.g., a vinyl-terminated polydimethylsiloxane). In certain embodiments, a catalyst is included to speed up the reaction. In additional embodiments, an inhibitor may be used to slow down the rate of reaction. The components of the dry silicone gels, their resulting properties, and their end-use are described in greater detail below.

In certain embodiments, the dry silicone gel is made by an addition cure or platinum cure reaction mechanism. In some embodiments, the mechanism employs the use of a catalyst. By using a catalyst, the activation energy of the reaction is lowered and faster curing times at lower temperatures can be achieved. A schematic overview of the platinum cure reaction mechanism is shown below in (I).

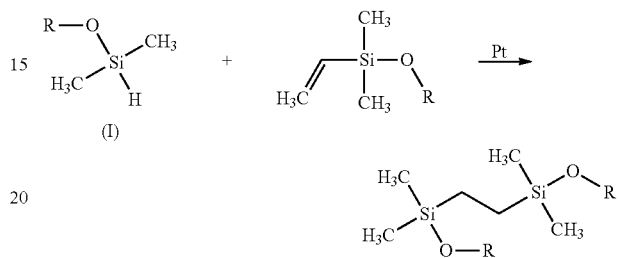

(I)

For the reaction in (I) to be made possible, two functional groups must react with each other. In certain embodiments, the two functionalities are (1) the Si—H group and (2) the Si-vinyl group. These two functionalities may be provided by: (1) a base polymer, (2) a crosslinker, and (3) a chain extender.

Base Polymer

In certain embodiments, the Si-vinyl group is provided by a base polymer such as a vinyl terminated polydimethylsiloxane (otherwise referred to as "V-PDMS"), which is shown below in (II). In this example, the base polymer compound comprises a vinyl group at each end of the compound.

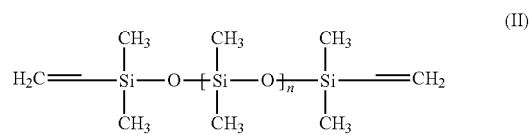

(II)

In certain embodiments, the molecular weight of the base polymer is controlled through anionic ring-opening polymerization of cyclic siloxanes in the presence of alkali-metal hydroxide of a base that is volatile (e.g., tetramethylammonium silanolate). Endcapping of the PDMS with a vinyl group is needed, so these groups are added to the polymerization mixture. V-PDMS together with the chain extender determine the molecular weight between the different crosslink sites.

The vinyl-containing base polymer, such as V-PDMS, may have different viscosities that affect the resulting dry silicone gel. In general, a high molecular weight V-PDMS will produce an uncured gel with a higher viscosity. In certain embodiments, a low molecular weight V-PDMS generally improves processability. In other embodiments, the V-PDMS used in the dry silicone gel has a viscosity between approximately 500 and 165,000 cSt (500-165,000 mm$^2$/s), between approximately 1000 cSt and 50,000 cSt (1000-50,000 mm$^2$/s), between approximately 3000 cSt and 7000 cSt (3000-7000 mm$^2$/s), or between approximately 4500 cSt and 5500 cSt (4500-5500 mm$^2$/s).

In some embodiments, the vinyl-terminated polydimethylsiloxane has a molecular weight between about 20,000 g/mol and about 50,000 g/mol. In other embodiments, the vinyl-terminated polydimethylsiloxane has a molecular weight between about 50,000 g/mol and about 80,000 g/mol. In yet other embodiments, the vinyl-terminated polydimethylsiloxane has a molecular weight between about 28,000 g/mol and about 72,000 g/mol. In one particular embodiment, the vinyl-terminated polydimethylsiloxane has a molecular weight of approximately 49,500 g/mol.

In certain embodiments, the base polymer contains between approximately 1 and 10 mol of vinyl per 500,000 g/mol of V-PDMS. In one embodiment, the base polymer contains approximately 2 mol of vinyl per 200,000 g/mol of V-PDMS (the vinyl end group concentration would be in the order of $10^{-5}$). In yet other embodiments, the vinyl content of the V-PDMS is between approximately 0.01 and 0.1 mmol/g, or between approximately 0.036 and 0.07 mmol/g.

Crosslinker

In certain embodiments, the Si—H end groups for the reaction in (I) may be provided by a crosslinker and/or a chain extender. A crosslinker is capable of forming connections between vinyl-terminated polydimethylsiloxane chains. In certain embodiments, the crosslinker includes electronegative substituents such as alkylsiloxy or chlorine. In one embodiment, the crosslinker comprises four Si—H groups that are capable of forming a connection point between four different vinyl-terminated polydimethylsiloxane chains. In some embodiments, the crosslinker is tetrakis(dimethylsiloxy)silane, shown below in (III). In other embodiments, the crosslinker is methyltris(dimethylsiloxy)silane. Other crosslinkers may also be used. Using higher functional crosslinkers is also possible, but these form less defined polymer structures.

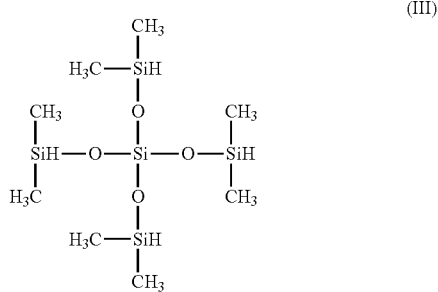

(III)

Chain Extender

In addition to the crosslinker, the Si—H end group may be provided by a chain extender, wherein both ends of the chain extender compound are terminated with a Si—H group.

In certain embodiments, the chain extender comprises reactive groups that are compatible and are willing to react with the vinyl groups in the base polymer. Just as for the crosslinker, these groups are Si—H groups that can react in a hydrosilation reaction. The chain extender typically includes two functional groups; however, the chain extender may include three or more functional groups, such that the chain extender functions as a branching agent. The functional groups may be the same as or different than each other. The functional groups may also be the same as or different than the functional groups of the first component and/or the second component.

The chain extender may be any chain extender known in the art. In one embodiment, the chain extender is a hydride containing polydimethylsiloxane. In another embodiment, the chain extender is a hydride terminated polydimethylsiloxane, shown below in (IV).

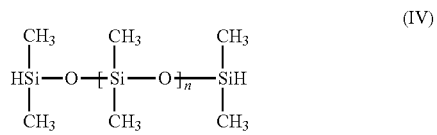

(IV)

In a further embodiment, the chain extender is a hydride terminated polyphenylmethylsiloxane. In another embodiment, the chain extender is a hydride terminated polydiphenylsiloxane. In yet another embodiment, the chain extender is a dihydride containing siloxane. The chain extender may have a high molecular weight or a low molecular weight. The chain extender may also be branched or unbranched. In other embodiments, the chain extender is a high molecular weight polydimethylsiloxane. In other embodiments, the chain extender is a low molecular weight polydimethylsiloxane.

In other embodiments, the chain extender is a functionally-terminated silicone such as a silanol terminated, vinyl terminated, and amino terminated polydimethylsiloxane. Such silicones have low tear strength and can be toughened by incorporating fumed silica ($SiO_2$) into the structure. For example, an alkoxy-functionalized siloxane can be included. Suitable alkoxy-functionalized siloxanes include polydiethoxysiloxane, tetraethoxy silane, tetramethoxy silane, and polydimethoxy siloxane. In other embodiments, the chain extender is a fluorosilicone, phenyl silicone, or a branching diethyl silicone.

In certain embodiments, by making use of the chain extender molecule, the V-PDMS base polymer can be shorter because the H-PDMS chain extender will extend the V-PDMS base polymer chain in situ between two crosslinker compounds. By using this mechanism, a V-PDMS chain of a shorter length can be applied which leads to lower viscosities and compounds that are easier to work with. Therefore, lower viscosity base polymer compounds can be used unlike a peroxide activated cure reaction mechanism. For example, a peroxide activated cure mechanism makes use of polymer chains with viscosities of approximately 2,000,000 cSt (2,000,000 mm$^2$/s) while in the platinum cure mechanism allows for base polymer chains (V-PDMS) having viscosities of approximately 5,000 cSt (5,000 mm$^2$/s).

MFHC and H/V Ratios

The amounts of crosslinker and chain extender that provide the hydride component may be varied. In certain embodiments, the amount of hydride in the gel is defined in terms of the mole fraction of hydride present as crosslinker ("MFHC"). For example, when the MFHC value is 0.3 or 30%, this means that 30% of the hydrides present in the system are part of the crosslinker and the remaining 70% of the hydrides are provided by the chain extender. In certain embodiments, the MFHC ratio may be altered to adjust the hardness of the gel (i.e., an increase in the MFHC may increase the hardness). In certain embodiments, the MFHC value is greater than 0.2, 0.3, 0.4, or 0.5. In some embodiments, the MFHC value is between 0.2 and 0.5. In other embodiments, the MFHC value is between 0.3 and 0.4.

The overall amount of hydride components in the gel can also vary. The ratio of hydride to vinyl components (provided by the base polymer) can be defined as "HN." In other words, H/V is the total moles of hydride (contributions from crosslinker and chain extender) divided by the amount in moles of vinyl from the base polymer (e.g., V-PDMS) present. In certain embodiments, the dry silicone gel has a H/V ratio between 0.5 and 1.0, between 0.6 and 1.0, between 0.7 and 1.0, between 0.8 and 1.0, or between 0.9 and 1.0. If the HN ratio is greater than 1, this means that there are more hydride groups present in the system than vinyl groups. In theory, the dry silicone gel will have a maximum hardness where the HN ratio is 1 (this is the theoretical point where all the groups react with each other.) However, in practice this is not always the case and the maximum will be situated in the neighborhood of H/V equals 1.

Figure 5:
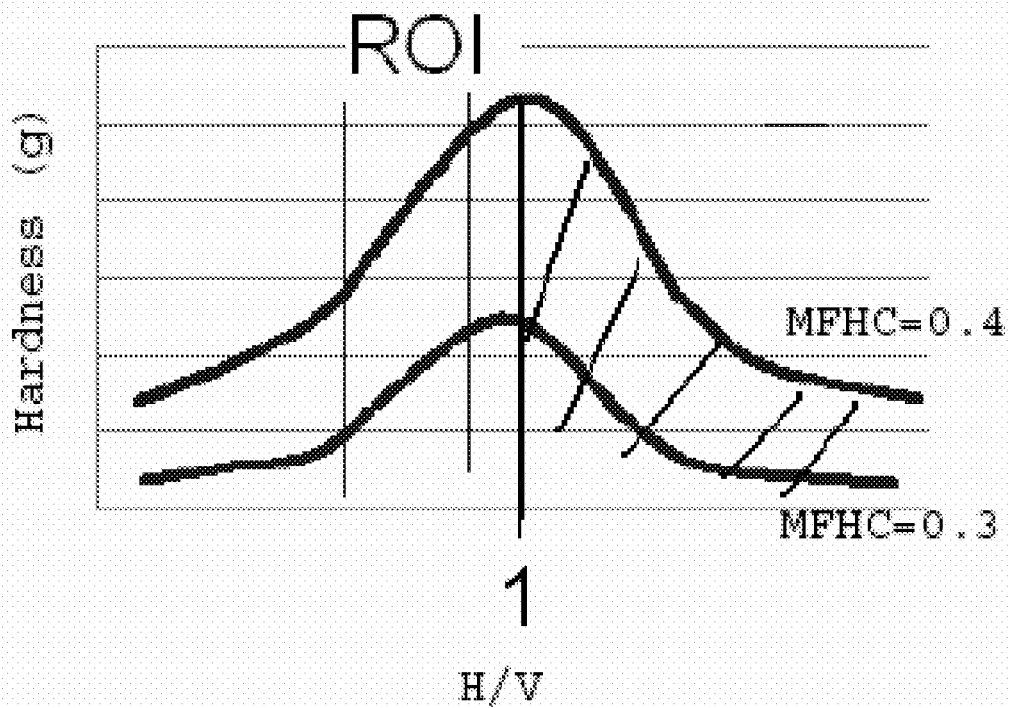
FIG. 5 is a graph showing a theoretical stoichiometric curve comparing the hardness of the dry silicone gel as a function of the mole fraction of hydride content in the crosslinker ("MFHC") and the hydride/vinyl ratio ("HN").

A theoretical representation depicting the relation between hardness of the dry silicone gel and the H/V ratio is shown in FIG. 5. In certain embodiments, the region of interest (or "ROI") for the dry silicone gel comprises slightly less hydrides than vinyl groups (i.e., the H/V is less than but close to 1). This is because gels with HN values greater than 1 can undergo undesired post-hardening of the gel. With the help of the stoichiometric curve shown in FIG. 5, the relationship between the amount of hydride groups and the amount of vinyl can be calculated to get a certain hardness. This value can be used to obtain the different amount of reagents needed to make a gel with the wanted hardness.

A schematic overview of the reaction is depicted in (V) below, wherein the crosslinker compounds are represented by "+," the chain extender compounds are represented by "=," and the base polymer V-PDMS compounds are represented by "-." In certain embodiments, the chain extender must always connect two different base polymer compounds, or connect to one base polymer and terminate the chain on the opposite end.

(V)

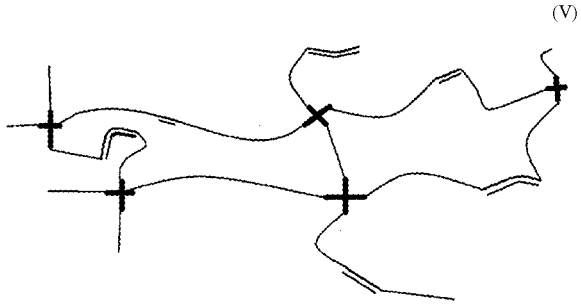

Catalyst

In certain embodiments, an addition cure catalyst is used to assist in reacting the base polymer, crosslinker, and chain extender. Performing the reaction without using a catalyst is typically a very energy consuming process. Temperatures of 300° C. or even higher are needed in order to avoid the produced gel to have poor and inconsistent mechanical properties.

In certain embodiments, the catalyst includes a Group VIII metal. In other embodiments, the catalyst comprises platinum. Platinum catalyst can be prepared according to methods disclosed in the art, e.g., Lewis, Platinum Metals Rev., 1997, 41, (2), 66-75, and U.S. Pat. No. 6,030,919, herein incorporated by reference. In another embodiment, the catalyst is a homogenous catalyst. In other embodiments, the catalyst is a heterogeneous catalyst. Examples of heterogeneous catalysts include platinum coated onto carbon or alumina.

In one embodiment, the catalyst is "Karstedt's catalyst." This is a platinum catalyst made of Pt complexed with divinyltetramethyldisiloxane, shown below in (VI).

(VI)

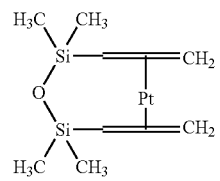

An advantage of this catalyst is the fact that no heterogeneous reaction is taking place but that the catalyst will form a colloid. An advantage of these catalysts is the fact that only a small amount (ppm level) is needed. This reduces the cost of the polymerization process.

In another embodiment, the catalyst may be a rhodium chloride complex, e.g., tris(triphenylphosphine)rhodium chloride ("Wilkinson's catalyst").

Rhodium based catalysts may require higher concentrations and higher reaction temperatures to be successful to a large extent. But poisoning comes together with reactivity; and therefore rhodium based catalysts may be less easily poisoned than platinum catalysts.

In yet other embodiments, the catalyst may be a carbonyl derivation of iron, cobalt, and nickel. In one embodiment, the catalyst is dicobaltoctacarbonyl $CO_2(CO)_8$. High temperatures (e.g., >60° C.) should be avoided in order to prevent decomposition and deactivation of the catalyst. In comparison to the Pt catalyst, here $10^{-3}$M are needed in the case of Pt which is $10^{-6}$M or ppm level. Also the reactivity is slowed down by a factor of 5.

The catalytic reaction mechanism is a Lewis-mechanism. First, there is a coordination of oxygen to the catalyst in the presence of the crosslinker or chain extender. This step is called the induction period. This gives hydrogen and the platinum colloid. Next, the chain extender or crosslinker will precede the attack of the vinyl group. By doing this, an electrophile complex is formed. The vinyl group (V-PDMS) then will act as a nucleophile. Combining both the vinyl-group of the V-PDMS chain with the crosslinker or chain extender that was bound to the Pt-catalyst gives the silicone product. The hydride is transferred to the second carbon of the vinyl group. The Pt-colloid is than available for reacting a second time. Oxygen can be seen as a co-catalyst because oxygen is not consumed in this reaction and the O—O is not broken in the reaction sequence.

Catalysts should be isolated from compounds that can poison, or otherwise harm, the catalyst's performance. For example, amines, thiols, and phosphates can all poison a catalyst such as a platinum containing catalyst. Amines, thiols, and phosphates may form very stable complexes with a catalyst, thereby slowing the reaction or altogether stopping the reaction.

Inhibitor

In certain embodiments, inhibitors are added in the silicone gel formulation to slow down the curing process. Slowing down the curing process allows more time to work with the polymer mixture during processing, dispensing, and molding.

The inhibitor can bind to the catalyst and form a stable complex. By doing this, the Pt catalyst is deactivated. When the complex is activated by adding energy (raising the temperature) the inhibitor will lose its binding for the Pt-catalyst. After this, the Pt-catalyst is in its activated form again and the polymerization reaction can start. The inhibitor may help manipulate the gel before it fully cures and extend the pot life.

In certain embodiments, the pot life may be approximately 1 hour at room temperature and 6-8 hours at 3° C.

In certain embodiments, the inhibitor comprises two electron-rich groups (alcohol- and allylfunction) forming an acetylenic alcohol. These groups can interact with the catalyst and shield it from other reactive groups. In one embodiment, the inhibitor of a Pt-catalyst is 3,5-Dimethyl-1-hexyn-3-ol, shown below in (VII).

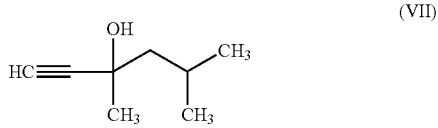

(VII)

Additives

In certain embodiments, the dry silicone gel composition may comprise additional common components. For example, the compositions may include additives such as flame retardants, coloring agents, adhesion promoters, stabilizers, fillers, dispersants, flow improvers, plasticizers, slip agents, toughening agents, and combinations thereof. In certain embodiments, the additional additives may include at least one material selected from the group consisting of Dynasylan 40, PDM 1922, Songnox 1024, Kingnox 76, DHT-4A, Kingsorb, pigment, and mixtures thereof. In some embodiments, the additives comprise between 0.1 and 25 wt % of the overall composition, between 0.1 and 5 wt % of the overall composition, between 0.1 and 2 wt % of the overall composition, or between 0.1 and 1 wt % of the overall composition.

In some embodiments, the compositions disclosed and by methods disclosed herein comprise a flame retardant. In certain embodiments, the flame retardant is zinc oxide. In some embodiments, the flame retardant comprises between 0.1 and 25 wt % of the overall composition, between 0.1 and 5 wt % of the overall composition, between 0.1 and 2 wt % of the overall composition, or between 0.1 and 1 wt % of the overall composition. In one embodiment, the flame retardant comprises 20 wt % of the overall gel composition.

In some embodiments, the compositions disclosed and made by methods disclosed herein contain at least one stabilizer. Stabilizers include antioxidants, acid-scavengers, light and UV absorbers/stabilizers, heat stabilizers, metal deactivators, free radical scavengers, carbon black, and antifungal agents.

Making the Dry Silicone Gel

In one embodiment, the dry silicone gel is prepared by mixing a first set of components together, mixing a second set of components together, and then mixing the two sets of components together. The first set of components comprises blending the base polymer (e.g., V-PDMS) with the catalyst. The second set of components comprises blending the crosslinker and chain extender. The second set of components may also comprise blending additional base polymer, and in some embodiments, an inhibitor. In some embodiments, the first and/or second set of components may also comprise blending at least one of the additives discussed above. In certain embodiments, the amount of catalyst present in the first set of components is between 0.01-1 wt %, between 0.05-0.1 wt %, or approximately 0.083 wt %. In some embodiments, the remainder of the first set of components is the base polymer.

Regarding the second set of components, in certain embodiments, the amount of crosslinker is between 0.1-1 wt %, between 0.2-0.4 wt %, or approximately 0.3 wt %. In certain embodiments, the amount of chain extender in the second set of components is between 0.5-5 wt %, between 1-3 wt %, or between 1.5-2.5 wt %. In some embodiments, the amount of inhibitor in the second set of components is between 0.01-0.1 wt %, between 0.1-0.5 wt %, or approximately 0.04 wt %. In other embodiments, the amount of base polymer in the second set of components is between 95-99.9 wt %, between 96-99 wt %, or between 97-98.5 wt %.

In certain embodiments, the amount of combined crosslinker and chain extender in the overall dry silicone gel is between 0.1-5 wt %, between 0.5-2 wt %, between 0.75-1.5 wt %, or approximately 1.25 wt %.

The dry silicone gel is then prepared by mixing the first set of components with the second set of components. In one embodiment, the weight ratio of the blend of the first set of components to the second set of components is approximately 1:1. In another embodiment, the weight ratio of the blend is between approximately 47.5:52.5 and 52.5:47.5. Adjusting the ratio slightly can cause large differences in the overall hardness of the dry silicone gel. For example, in certain embodiments, when the ratio is 52.5:47.5 between the first and second set of components (wherein the second set of components comprises V-PDMS, crosslinker, chain extender, and inhibitor), the hardness may be lower than the hardness of the same composition at the 1:1 blending ratio. Additionally, in certain embodiments, when the ratio is 47.5:52.5 between the first and second set of components, the hardness may be greater than hardness of the same composition at the 1:1 blending ratio. In one example, the hardness may be approximately 72 g at the 52.5:47.5 ratio, 140 g at the 1:1 ratio, and about 210 g at the 47.5:52.5 ratio. In other words, a 2.5% variation may affect the hardness of the gel by as much as 70 g. Therefore, the weighing procedure during the preparation of the gel composition needs to be carried out with a high precision.

Uses and Properties of the Dry Silicone Gel

The dry silicone gels described herein may be used in a number of end uses due to their improved properties, such as improved behavior in mechanical stresses (e.g., vibration and shock) or ability to seal uneven or complicated structures (due to the ability to flow and adapt to the area of the structure). In certain embodiments, the dry silicone gels may be used in an interconnect, cover, or closure system. In particular, the dry silicone gel may be used in a fiber optic closure, electrical sealant, or electrical closure. In some embodiments, the dry silicone gels are used as gel wraps, clamshells, or gel caps. In further embodiments, the dry silicone gels are used in the inside of a residence. In other embodiments, the dry silicone gels are used outside of a residence. Use of the dry silicone gel within a closure or interconnect system may allow for a reduction in the number of components, frame size, or cost over other sealing mechanisms.

In certain embodiments, the dry silicone gel is used as a flame retardant sealant. In one embodiment, the dry silicone gel comprises a flame retardant additive (e.g., zinc oxide) in order to function as a flame retardant sealant.

In certain embodiments, the dry silicone gel is used in a closure system. In certain embodiments, the closure system comprises a housing, a cable, and a dry silicone gel. In some embodiments, the cable is a LSZH cable.

In some embodiment, the system further comprises a connector, and, in some instances, a receptacle or port, therein forming an interconnect system. The interconnect system may comprise a mini input/output connector, data connector, power connector, fiber optic connector, or combination thereof. For example, the interconnect system may comprise a RJ-45 connector system. Non-limiting examples of interconnect systems and components are displayed in FIGS. 6, 7, 8, 9a, 9b, 10a, and 10b.

The dry silicone gel may be used to create a seal formed by displacement. In other embodiments, the dry silicone gel may be used to create a seal having radial functionality, axial functionality, or a combination thereof. In yet other embodiments, the dry silicone gel may be used to create a seal formed by displacement and having radial and/or axial functionality.

Figure 6:
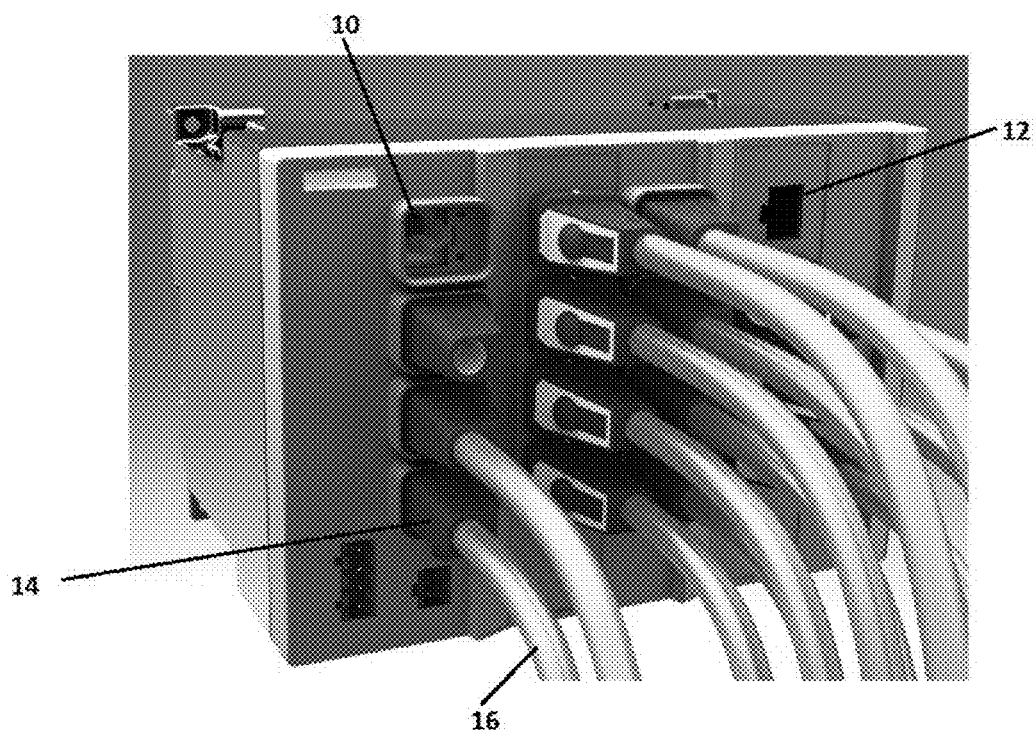
FIG. 6 is a depiction of an interconnect system having a connection hub having multiple connection ports or receptacles for the connector, housing, and cable components to be connected.
Figure 7:
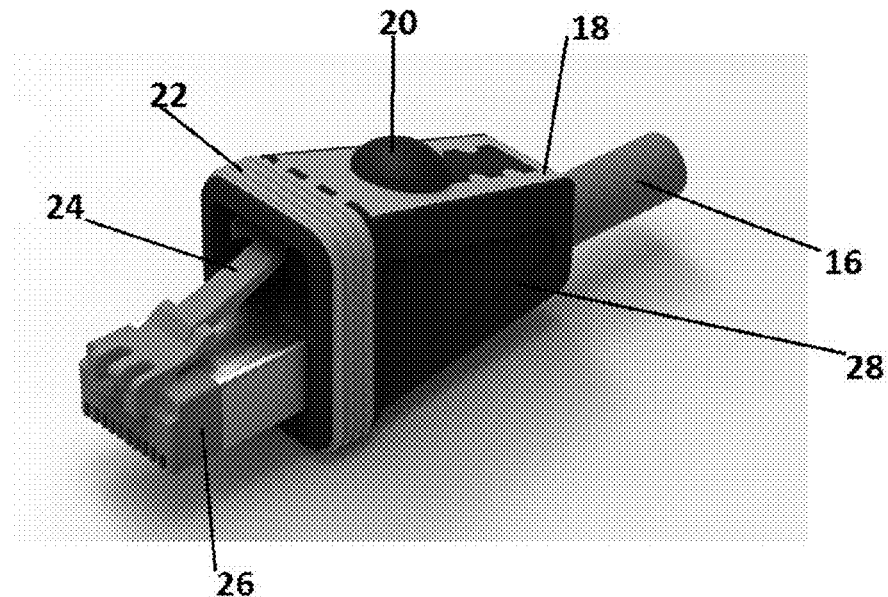
FIG. 7 is a depiction of a connector, housing, and cable assembly with radial sealing.
Figure 8:
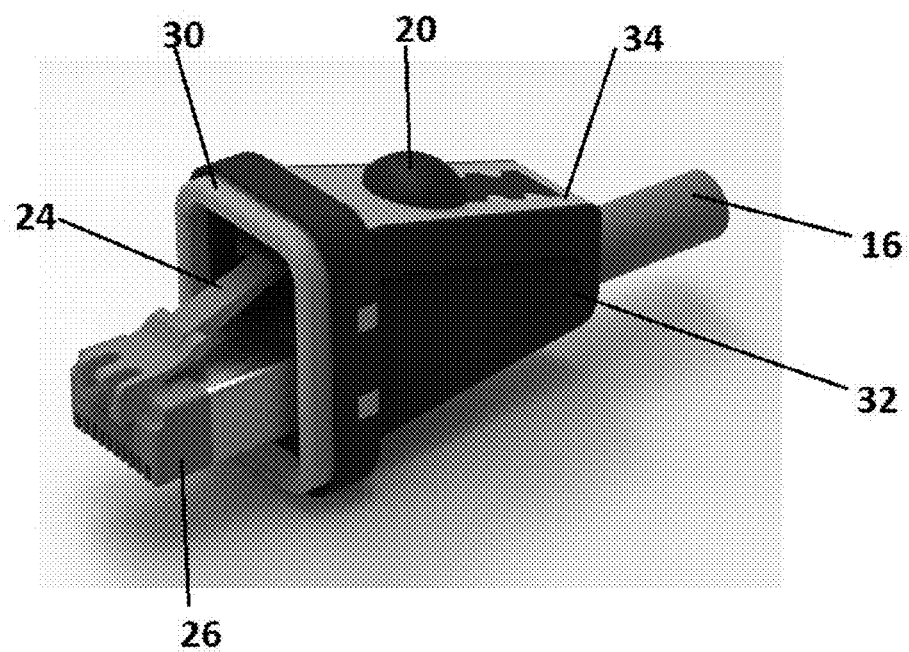
FIG. 8 is a depiction of a connector, housing, and cable assembly with axial sealing.

FIGS. 6, 7, and 8 provide non-limiting examples of radial and axial functionality. FIG. 6 displays an example of a connection hub having multiple connection receptacles or ports for the cables 16 within the housings 14 to be connected. FIG. 6 displays both radial connection ports 10 and axial connection ports 12. FIG. 7 displays a connector 26; housing 18, 28; and cable 16 assembly with radial sealing 22. FIG. 8 displays a connector 26; housing 32, 34; and cable 16 assembly with axial sealing 30, wherein the seal follows the surface of the axial port 12. In certain embodiments, the housing may have a knob 20 that may be pushed inward to engage the latch 24 on the connector 26, allowing the connector to be removed from the port.

Figure 9A:
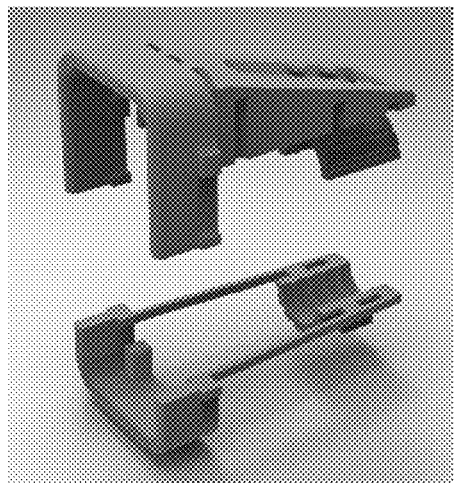
FIGS. 9a and 9b are depictions of a straight two piece housing assembly designed for axial sealing.
Figure 9B:
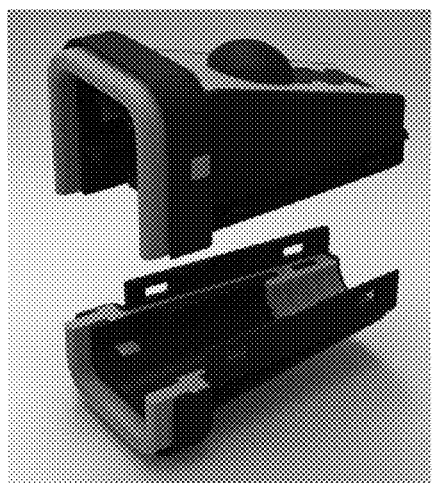
Figure 10A:
FIGS. 10a and 10b are depictions of an angled two piece housing assembly designed for axial sealing.
Figure 10B:
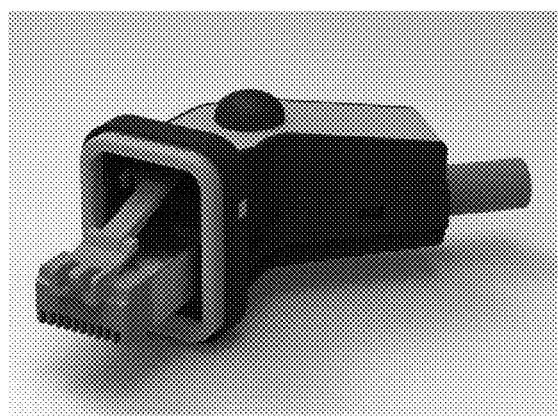

In certain embodiments, the dry silicone gel may be used to create a seal in a housing assembly having multiple parts. For example, in one embodiment the dry silicone gel may be used in a straight two-piece housing assembly, as shown in FIGS. 9a and 9b. In another embodiment, the dry silicone gel may be used in an angled two-piece housing assembly, as shown in FIGS. 10a and 10b.

The dry silicone gel may be sealed around the cable 16 by sliding a smaller diameter gel formation over the cable to create a seal through interference. In other embodiments, the seal may be created by molding the dry silicone gel around the inside of the housing components and then snapping the housing, gel, and cable into place.

In some embodiments, the dry silicone gel is used in a closure or interconnect system that is "compatible" with a low smoke zero halogen (LSZH) cable. In certain embodiments, compatibility is measured by subjecting the sample to one or more mechanical or environmental tests to test for certain functional requirements. In some embodiments, compatibility is measured by passing a pressure loss test, tightness test, and/or visual appearance test. In certain embodiments, the dry silicone gel in the closure or interconnect system is compatible where a traditional thermoplastic elastomer gel would fail (as shown and described in the examples and figures).

Tightness may be tested under International Electrotechnical Commission (IEC) Test 61300-2-38, Method A and IEC 60068-2-17, Test Qc. In certain embodiments, tightness is tested by immersing the specimen in a water bath and using an internal pressure of 20-40 kPa (0.2-0.4 atm) for 15 minutes. It is important that tightness is measured directly after installing the closure at a temperature of −15° C. or 45° C. It is also important that all the air bubbles present on the outside of the closure are removed. If a continuous stream of air bubbles is observed, this means the specimen is not properly sealed and it will be considered as a failure (i.e., not compatible).

Pressure loss may be tested under IEC 61300-2-38, Method B. In certain embodiments, the gel and cable are compatible if the difference in pressure before and after the test is less than 2 kPa (0.02 atm).

Visual appearance may be tested under IEC 61330-3-1 by examination of the product with the naked eye for defects that could adversely affect the product performance.

The sample may be subjected to various mechanical and/or environmental conditions prior to testing tightness, pressure loss, visual appearance, etc. In certain embodiments, compatibility is determined by subjecting the sample to one or more of the following mechanical tests: axial tension test, flexure test, re-entry test, and torsion test, and/or one or more environmental tests: resistance to aggressive media test, resistance to stress cracking test, salt fog test, temperature cycling test, and waterhead test.

In certain embodiments, the sample is subjected to an axial tension test according to IEC 61300-2-4. In this test, the sample may be pressured internally at 20 kPa (0.2 atm) or 40 kPa (0.4 atm) at room temperature and sealed. The base assembly is clamped and a force is applied to each of the extending cables individually. If the sample has an outer diameter of less than or equal to 7 mm, then the amount of force per cable applied is equal to (outer diameter/45 mm)*500 Newtons ("N"). This force is applied for 15 minutes for each cable and built up to the MC 61300-2-4 test. If the sample has an outer diameter of greater than 7 mm, then the amount of force per cable applied is equal to (outer diameter/45 mm)*1000 N, with a maximum of 1000 N applied. This force is applied for one hour. Internal pressure is then examined for pressure loss. In certain embodiments, the gel and cable are compatible if the pressure loss is less than 2 kPa (0.02 atm). In addition, in certain embodiments, the gel and cable are compatible if the displacement of the cable is less than 3 mm. In other embodiments, the specimens are further subjected to the tightness test, previously described.

In other embodiments, compatibility is measured by subjecting the sample to a flexure test according to IEC 61300-2-37. In this test, the samples are subjected to temperatures of −15° C. and 45° C. Samples are pressured internally at 20 kPa or 40 kPa (0.2 atm or 0.4 atm) and sealed. Cables are bent individually at an angle of 30° (or a maximum force application of 500 N) each side of neutral in the same plane. Each bending operation is held for 5 minutes. The cable is returned to its original position and then the procedure is repeated in the opposite direction. After 5 cycles on each cable, the samples are visually inspected by the naked eye for appearance, conditioned at room temperature, and subjected to a tightness test. In some embodiments, the gel and LSZH cable are compatible if the specimen passes the visual appearance test, pressure loss test (i.e., less than 2 kPa (0.02 atm)), and/or tightness test.

In another embodiment, compatibility is measured by subjecting the sample to a re-entry test according to IEC 61300-2-33. In certain embodiments, re-entry can be simulated after a certain time of temperature cycling. To complete this test, the closure has to be removed from the cycling room and tested on tightness. After this a reentry test can be done. In this test, a dummy plug or cable is removed from the closure and another cable or dummy plug is added. Then, tightness is measured again. Re-entry is successful if the closure passes the tightness test again.

Another mechanical test may be employed to determine compatibility. The sample may be subjected to a torsion test according to IEC 61300-2-5. After completion of the torsion test, the gel and cable may be considered compatible if the sample passes the visual inspection test, pressure loss test, and/or tightness test.

In yet other embodiments, compatibility is measured by conducting an environmental test of temperature cycling or accelerated aging under IEC 61300-2-22 and IEC 60068-2-14, Test Nb. In one embodiment, the temperature cycling test is conducted on the cable jacket between the gel blocks by cycling the temperature between −40° C. and 70° C. for 10 days at two cycles between the extreme temperatures per day. In some embodiments, the humidity is uncontrolled, the dwell time is four hours and the transition time is two hours.

In certain embodiments, the cable jacket is tested for maintenance of tensile strength, ultimate elongation, tightness, visual appearance, and/or re-entry. Also, in certain embodiments, after the temperature cycling test, tightness of the closures needs to be tested after being conditioned to room temperature for a minimum of 2 hours. Therefore, in certain embodiments, the gel and LSZH cable are compatible if the specimen passes the tightness test.

In another embodiment, compatibility is determined by subjecting the sample to a resistance to aggressive media test under IEC 61300-2-34, ISO 1998/I, and EN 590. The sample is considered compatible if it subsequently passes the tightness and/or appearance test.

In yet another embodiment, compatibility is determined by subjecting the sample to a resistance to stress cracking test under IEC 61300-2-34. The sample is considered compatible if it subsequently passes the tightness test and/or shows no visible signs of cracking.

In other embodiments, compatibility is determined by subjecting the sample to a salt fog test under IEC 61300-2-36 and IEC 60068-2-11, Test Ka. The sample is considered compatible if it subsequently passes the tightness and/or appearance test.

In some embodiments, compatibility is determined by subjecting the sample to a waterhead test under IEC 61300-2-23, Method 2. The sample is considered compatible if there is no water ingress.

In certain embodiments, the dry silicone gel has measurable properties. For example, in some embodiments, the dry silicone gel has a hardness in the range of 26 to 53 Shore 000 Hardness, or 100 to 300 g, as measured according to methods known in the art. In certain embodiments, the shore hardness gauge is measured according to ISO868 or ASTM D2240. In other embodiments, hardness can be measured on a texture analyzer. For example, a LFRA Texture Analyzer-Brookfield may include a probe assembly fixed to a motor driven, bi-directional load cell. In such a system, the probe is driven vertically into the sample at a pre-set speed and to a pre-set depth. The hardness is the amount of force needed to push the probe into the test sample. In other embodiments, the dry silicone gel has a hardness in the range of 37 to 45 Shore 000, or 160 to 220 g. In yet other embodiments, the dry silicone gel has a hardness in the range of 38 to 42 Shore 000, or 170 to 200 g.

For further example, in some embodiments, the compression set, as measured after 50% strain is applied for 1000 hours at 70° C., has a range between 4% and 20%. In other embodiments, the compression set, as measured after 50% strain is applied for 1000 hours at 70° C., has a range between 10% and 14% when measured according to the modified version of ASTM D395, method B described above.

In some embodiments, the gel is compressed with a certain strain or deformation (e.g., in certain embodiments, to 50% of its original size). This causes a certain stress in the material. The stress is now reduced because the material relaxes. In certain embodiments, the stress relaxation of the dry silicone gel has a possible range between 30 and 60% when subjected to a tensile strain or deformation of about 50% of the gel's original size, wherein the stress relaxation is measured after a one minute hold time at 50% strain. In other embodiments, the stress relaxation of the dry silicone gel is between 40% and 60% when subjected to a tensile strain of about 50%. A higher stress relaxation indicates that once a gel is installed in a closure, the gel will require less stress in order for it to seal.

In certain embodiments, the dry silicone gel composition has less than 10% oil bleed out over a period of time when the gel is under compression of 120 kPa (1.2 atm) at 60° C. In certain embodiments, oil bleed out is measured on a wire mesh, wherein the oil loss may exit the gel through the mesh. The weight of the gel sample is recorded before and after the pressure has been applied. In some embodiments, the gel has less than 8% oil bleed out over the period of time. In other embodiments, the gel has less than 6% oil bleed out over the period of time. In certain embodiments, the oil loss is measured at 200 hours, 400 hours, 600 hours, 800 hours, 1000 hours, 1200 hours, or 1440 hours (60 days).

In certain embodiments, the dry silicone gel has less oil bleed out in comparison to a thermoplastic gel over the same period of time at 120 kPa (1.2 atm) at 60° C. In some embodiments, the dry silicone gel has 40%, 50%, or 60% oil bleed out than the thermoplastic gel at 200 hours, 400 hours, 600 hours, 800 hours, 1000 hours, 1200 hours, or 1500 hours (about 60 days).

EXAMPLES

Dry silicone gels were synthesized according to the following examples. A first set of components was prepared. To prepare the first set of components, a platinum catalyst complex (Karstedt catalyst, CAS-number 68478-92-2) from Sigma-Aldrich N.V./S.A., Bornem, Belgium, is added to a container. Vinyl-terminated polydimethylsiloxane (CAS-number 68083-19-2) from ABCR GmbH & Co. KG, Karlsruhe, Germany, is combined with the catalyst in a ratio of 100:0.0311.

The catalyst is added first, this compound needs to be added to the bottom of the container and make sure no catalyst is splashed onto the sides. After adding the catalyst the V-PDMS can be added by pouring it into the container until about 10 grams from what needs to be weighed out. The last 10 or more grams are added with more precision by the use of a large pipette or syringe. It is best to start mixing at low rpm (100 rpm) and gradually increasing to 500 rpm in 2 minutes. After the 2 minutes mixing, the mixing speed can be increased to 1200-1400 rpm for 3 minutes.

To prepare a second set of components, a vinyl-terminated polydimethylsiloxane (CAS-number 68083-19-2) from ABCR GmbH & Co. KG is added to a crosslinker, GELEST SIT 7278.0, a chain extender GELEST DMS-H03, and an inhibitor, ALDRICH 27, 839-4. The crosslinker is added to the container first, because small variations in the added amount can greatly influence the hardness of the gel. If too much is added, this can always be sucked out again. Next, the inhibitor is added to the reaction container. The third component that needs to be weighed out is the chain extender. It is best to start mixing at low rpm (100 rpm). In 2 minutes go to 500 rpm and scrape off the sides of the container with a plastic rod. After this 2 minutes of mixing, the mixing speed can be increased to 1200-1400 rpm for 3 minutes.

The first set of components was mixed with the second set of components at 1:1 ratio in a vial. The two sets of components were mixed at 1250 rpm for 2-3 minutes, placed under vacuum for 4-5 minutes, and poured into the desired mold. The resulting molded mixture was placed under vacuum for 3 minutes and then cured for 30 minutes at 90° C. Dry silicone gels were made according to the following Examples 1-6.

|  | Example 1 Wt. % | Example 2 Wt. % | Example 3 Wt. % | Example 4 Wt. % | Example 5 Wt. % | Example 6 Wt. % |
|---|---|---|---|---|---|---|
| 1st Set of Components |  |  |  |  |  |  |
| Gelest DMS-35, vinyl | 99.917 | 99.917 | 99.917 | 99.917 | 99.917 | 99.917 |
| Catalyst | 0.083 | 0.083 | 0.083 | 0.083 | 0.083 | 0.083 |
| 2nd Set of Components |  |  |  |  |  |  |
| Gelest DMS-35, vinyl | 98.079 | 97.636 | 97.593 | 97.509 | 97.467 | 97.439 |
| Gelest SIT 7278.0, crosslinker | 0.329 | 0.279 | 0.284 | 0.294 | 0.299 | 0.302 |
| Gelest DMS-H03, chain extender | 1.552 | 2.045 | 2.083 | 2.157 | 2.194 | 2.219 |
| Aldrich 27,839-4, inhibitor | 0.040 | 0.040 | 0.040 | 0.040 | 0.040 | 0.040 |
| Hardness | 40 g | 75 g | 95 g | 145 g | 180 g | 205 g |

While not implemented in these Examples, in certain embodiments, additional additives may be added to the first set of components. In some embodiments, the additional additives may include at least one material selected from the group consisting of Dynasylan 40, PDM 1922, Songnox 1024, Kingnox 76, DHT-4A, Kingsorb, pigment, and mixtures thereof. In some embodiments, the additives comprise between 0.1 and 5 wt %, between 0.1 and 2 wt %, or between 0.1 and 1 wt % of the first set composition.

For further example, the first and second sets of components were mixed at 10 ratios from 47.5:52.5 to 52.5:47:5. Dry silicone gels were tested under controlled conditions in a closure system used in underground and aerial applications to repair fiber cables up to 12 fibers.

Dry silicone gels were further tested under controlled conditions in a closure system including a fiber organizer and cable closure used in fiber optic cables in above and below-ground environments. In addition, dry silicone gels were tested under controlled conditions in a closure organizer and multi-out system for cables having a small diameter.

The dry silicone gels were tested in a number of ways: temperature cycling, re-entry test, French water cycling, cold and hot installations, and kerosene exposure. For temperature cycling experiments, closures including dry silicone gels were exposed to temperatures between −30° C. and +60° C. for 10 days. Humidity was not controlled. The closures were cycled between the high and low temperatures two times a day for ten days. Samples were maintained at the extreme temperatures for four hours during each cycle.

For combined temperature cycling tests, dry silicone gels were installed in three closure systems. After installation the closures were tested on tightness and put into temperature cycling. After eight days a re-entry test was performed and after ten days the closures were taken out of cycling, tested on tightness and re-entry. Closures containing the standard thermoplastic gels were also tested.

For tightness testing, the closure is immersed in a water bath for 15 minutes and an internal pressure of 20 kPa. If air bubbles are observed, this means the closure is not properly sealed and it will be considered as a failure.

For re-entry testing, a dummy plug or cable is removed from the closure and another cable or dummy plug is added. Then, tightness is measured again. Re-entry is successful if the closure passes the tightness test again.

In certain embodiments, the dry silicone gel in the closure system is able to pass the tightness and re-entry tests where a traditional thermoplastic elastomer gel would fail (as shown and described in the examples and figures).

FIG. 1 shows the hardness (g) verses stress relaxation (%) of dry silicone gels as measured on a TA-XT2 texture analyzer from Texture Technologies (Westchester County, New York). The squares provide examples of gels that are tight and re-enterable; the red triangles provide examples of gels that fail on tightness and/or re-entry. The solid oval in the bottom left of the graph indicates examples of traditional thermoplastic elastomer gels. The solid oval to the right indicates a specific region for dry silicone gels. Three examples of dry silicone gel are shown within the oval. The dotted oval indicates an extended range of acceptable dry silicone gels.

Figure 2:
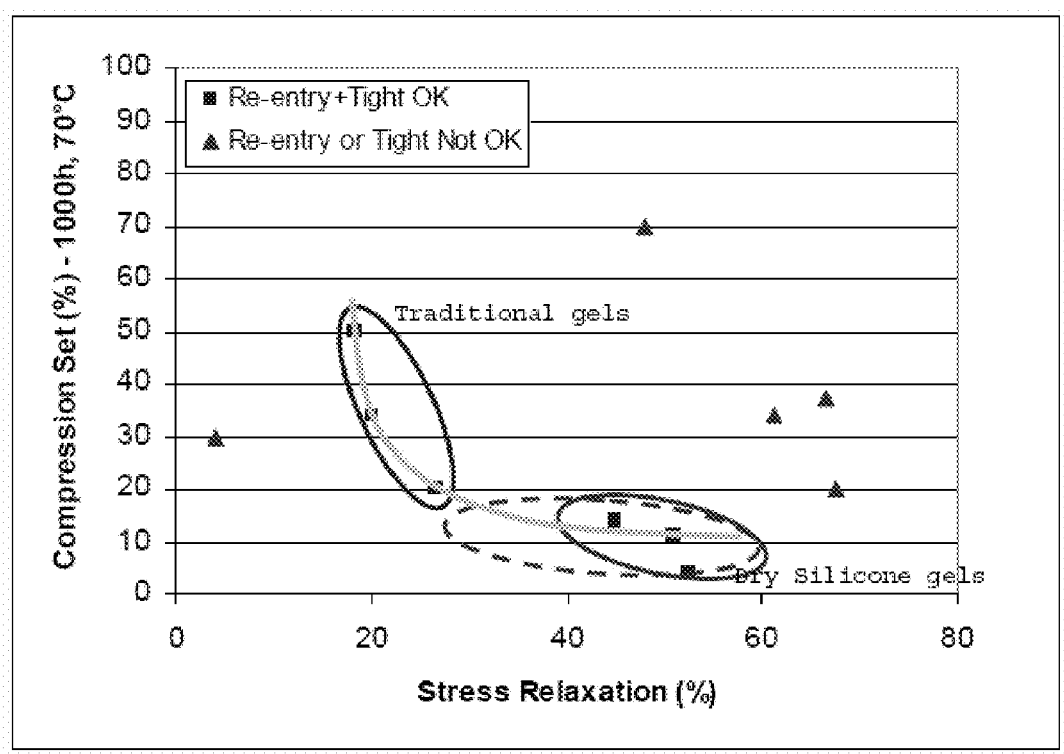
FIG. 2 is a graph showing the stress relaxation (%) versus the compression set (%) of dry silicone gels over 1000 hours at 70° C. The compression set was measured using a modified version of ASTM D395, method B. As opposed to using samples with a diameter of 29 mm a thickness of 12.5 mm, samples were measured having a diameter of 28 mm and thickness of 12 mm. The squares provide examples of gels that are tight and re-enterable; the red triangles provide examples of gels that fail on tightness and/or re-entry. The solid oval on the left of the graph indicates examples of traditional thermoplastic elastomer gels. The solid oval to the lower right indicates a specific region for dry silicone gels. Three examples of dry silicone gel are shown within the oval. The dotted oval indicates an extended range of acceptable dry silicone gels.

FIG. 2 shows the stress relaxation (%) versus the compression set (%) of dry silicone gels over 1000 hours at 70° C. The compression set was measured using a modified version of ASTM D395, method B. As opposed to using samples with a diameter of 29 mm a thickness of 12.5 mm, samples were measured having a diameter of 28 mm and thickness of 12 mm. The squares provide examples of gels that are tight and re-enterable; the red triangles provide examples of gels that fail on tightness and/or re-entry. The solid oval on the left of the graph indicates examples of traditional thermoplastic elastomer gels. The solid oval to the lower right indicates a specific region for dry silicone gels. Three examples of dry silicone gel are shown within the oval. The dotted oval indicates an extended range of acceptable dry silicone gels.

Figure 3:
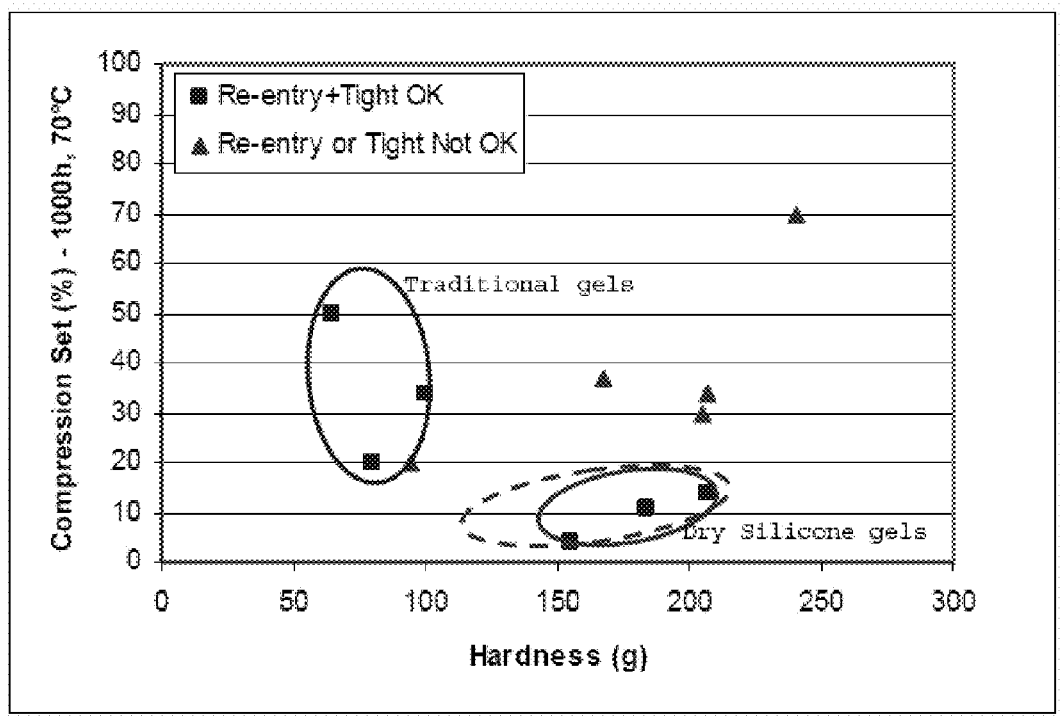
FIG. 3 is a graph showing the hardness (g) versus the compression set (%) of dry silicone gels over 1000 hours at 70° C. Again, compression set was measured with the modified version of ASTM D395, method B described above. The squares provide examples of gels that are tight and re-enterable; the red triangles provide examples of gels that fail on tightness and/or re-entry. The solid oval on the left of the graph indicates examples of traditional thermoplastic elastomer gels. The solid oval to the lower right indicates a specific region for dry silicone gels. Three examples of dry silicone gel are shown within the oval. The dotted oval indicates an extended range of acceptable dry silicone gels.

FIG. 3 shows the hardness (g) versus the compression set (%) of dry silicone gels over 1000 hours at 70° C. Again, compression set was measured with the modified version of ASTM D395, method B described above. The squares provide examples of gels that are tight and re-enterable; the red triangles provide examples of gels that fail on tightness and/or re-entry. The solid oval on the left of the graph indicates examples of traditional thermoplastic elastomer gels. The solid oval to the lower right indicates a specific region for dry silicone gels. Three examples of dry silicone gel are shown within the oval. The dotted oval indicates an extended range of acceptable dry silicone gels.

Figure 4:
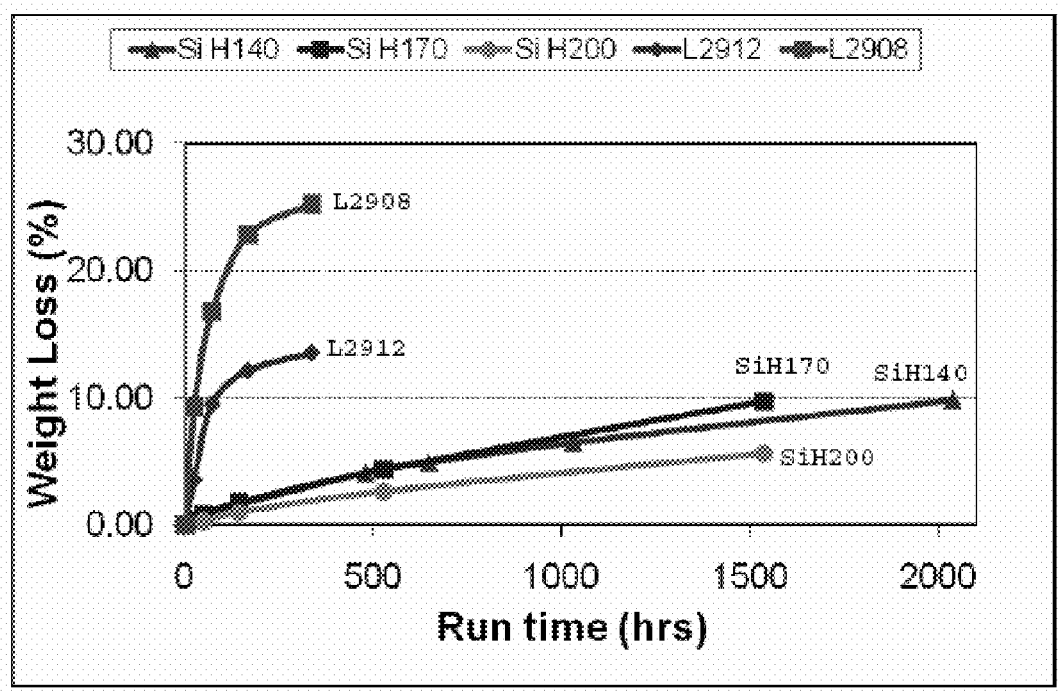
FIG. 4 is a graph showing the oil bleed-out of five gels under compression at a pressure of about 120 kPa (about 1.2 atm) and at a temperature of about 60° C. The gels labeled Si H140, Si H 170, and Si H200 are dry silicone gels having hardnesses of 140 g, 170 g, and 200 g, respectively. The gels labeled L2912 and L2908 are examples of thermoplastic elastomer gels.

Oil loss experiments were also conducted on dry silicone gels with hardness of 140 g, 170 g, and 200 g. FIG. 4 shows the oil bleed-out of five gels under compression at a pressure of about 120 kPa (about 1.2 atm) and at a temperature of about 60° C. The gels labeled Si H140, Si H 170, and Si H200 are dry silicone gels having hardnesses of 140 g, 170 g, and 200 g, respectively. The gels labeled L2912 and L2908 are examples of thermoplastic elastomer gels. The silicone gel with a hardness 200 g (Si H200) had the lowest amount of oil loss. After 1,500 hours, about 60 days, the oil loss for these dry silicone gels is between 8 and 10%. For hardness 200 g the oil loss was slightly less than 6%. The oil loss for the L2912 thermoplastic gel is about 16% after 1,500 hours. The data in FIG. 4 represents a reduction of 50% in oil loss compared to these thermoplastic gel systems.

Although examples have been described herein, it should be appreciated that any subsequent arrangement designed to achieve the same or similar purpose may be substituted for the specific examples shown. This disclosure is intended to cover any and all subsequent adaptations or variations of various examples. Combinations of the above examples, and other examples not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single example for the purpose of streamlining the disclosure. This disclosure is not to be interpreted as reflecting an intention that the claimed examples require more features than are expressly recited in each claim. Rather, as the following claims reflect, inventive subject matter may be directed to less than all of the features of any of the disclosed examples. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other examples, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method of using a dry silicone gel comprising:
   using a dry silicone gel as a sealant in a closure or interconnect system,
   wherein the dry silicone gel has a hardness between 100 g and 300 g, and wherein the dry silicone gel has at least one of the following properties selected from the group consisting of:
   (a) an original size and a stress relaxation between 30% and 60% when subjected to a deformation of 50% of the original size
   (b) a compression set between 4% and 20% after 50% strain has been applied to the gel for 1000 hours at 70° C., and
   (c) less than 10% oil bleed out under compression of 1.2 atm after 60 days at 60° C.

2. The method of claim 1, wherein the closure system is a fiber optic closure system.

3. The method of claim 1, wherein the closure system is an electrical closure system.

4. The method of claim 1, wherein the interconnect system comprises a mini input/output connector, a data connector, a power connector, a fiber optic connector, or combination thereof.

5. The method of claim 1, wherein the dry silicone gel has flame retardant properties.

6. A method of using a dry silicone gel comprising: using a dry silicone gel as a sealant in a closure or interconnect system, wherein the dry silicone gel is made by reacting:
   a crosslinker,
   a chain extender, and
   a vinyl-terminated polydimethylsiloxane,
   wherein the dry silicone gel has at least one of the following properties selected from the group consisting of:
   (a) an original size and a stress relaxation between 30% and 60% when subjected to a deformation of 50% of the original size
   (b) a compression set between 4% and 20% after 50% strain has been applied to the gel for 1000 hours at 70° C., and
   (c) less than 10% oil bleed out under compression of 1.2 atm after 60 days at 60° C.

7. The method of claim 1, wherein the dry silicone gel has a hardness between 160 g and 220 g.

8. The method of claim 1, wherein the dry silicone gel has property (a).

9. The method of claim 8, wherein the stress relaxation is between 40% and 60%.

10. The method of claim 1, wherein the dry silicone gel has property (b).

11. The method of claim 10, wherein the compression set is between 10% and 14%.

12. The method of claim 1, wherein the dry silicone gel has property (c).

13. The method of claim 1, wherein the dry silicone gel in the closure or interconnect system has less than a 0.02 atm pressure differential as measured by IEC 61300-2-38, Method B after the closure or interconnect system is subjected to at least one of the following tests: axial tension test according to IEC 61300-2-4, flexure test according to IEC 61300-2-33, and torsion test according to IEC 61300-2-5.

14. A method of using a dry silicone gel comprising:
   using a dry silicone gel as a sealant in a closure system, wherein the closure system is a fiber optic closure system,
   wherein the dry silicone gel is made by reacting
   a crosslinker,
   a chain extender, and
   a vinyl-containing polydimethylsiloxane, wherein the crosslinker, chain extender, and vinyl-containing polydimethylsiloxane are reacted in the presence of a catalyst;
   wherein the dry silicone gel has a hardness between 160 g and 220 g, wherein the dry silicone gel has an original size and a stress relaxation between 40% and 60% when subjected to a deformation of 50% of the original size,
   wherein the dry silicone gel has a compression set between 10% and 14% after 50% strain has applied to the gel for 1000 hours at 70° C., and
   wherein the dry silicone gel has less than 10% oil bleed out after being under compression of 1.2 atm for 60 days at 60° C.

15. A closure or interconnect system, comprising:
   a housing,
   a cable, and
   a dry silicone gel, wherein the dry silicone gel has a hardness between 100 g and 300 g.

16. The system of claim 15, wherein the dry silicone gel in the closure or interconnect system has less than a 0.02 atm pressure differential as measured by IEC 61300-2-38, Method B after the closure or interconnect system is subjected to at least one of the following tests: axial tension test according to IEC 61300-2-4, flexure test according to IEC 61300-2-33, and torsion test according to IEC 61300-2-5.

17. The system of claim 15, further comprising a connector and a receptacle for the connector.

18. A closure or interconnect system, comprising:
   a housing,
   a cable, and
   a dry silicone gel, wherein the dry silicone gel is made by reacting
   a crosslinker,
   a chain extender, and
   a vinyl containing polydimethylsiloxane, wherein the crosslinker, chain extender, and vinyl-containing polydimethylsiloxane are reacted in the presence of a catalyst.

19. The system of claim 15, wherein the dry silicone gel has a hardness from 160 g to 220 g.

20. The system of claim 15, wherein the dry silicone gel has an original size and a stress relaxation of between 40% to 60% when subjected to a deformation of 50% of the original size.

21. The system of claim 15, wherein the dry silicone gel has a compression set of between 4% to 20% after 50% strain has applied to the gel for 1000 hours at 70° C.

22. The system of claim 15, wherein the dry silicone gel has a compression set of between 10% to 14% after 50% strain has applied to the gel for 1000 hours at 70° C.

23. The system of claim 15, wherein the dry silicone gel has less than 10% oil bleed out under compression of 1.2 atm after 60 days at 60° C.

24. The system of claim 23, wherein the dry silicone gel comprises between 0.1 wt % and 25 wt % of a flame retardant additive.

25. The system of claim 24, wherein the flame retardant additive is zinc oxide.

* * * * *